May 13, 1924.
R. A. CROSBY
1,493,477
COTTER PIN TOOL
Filed June 28, 1922
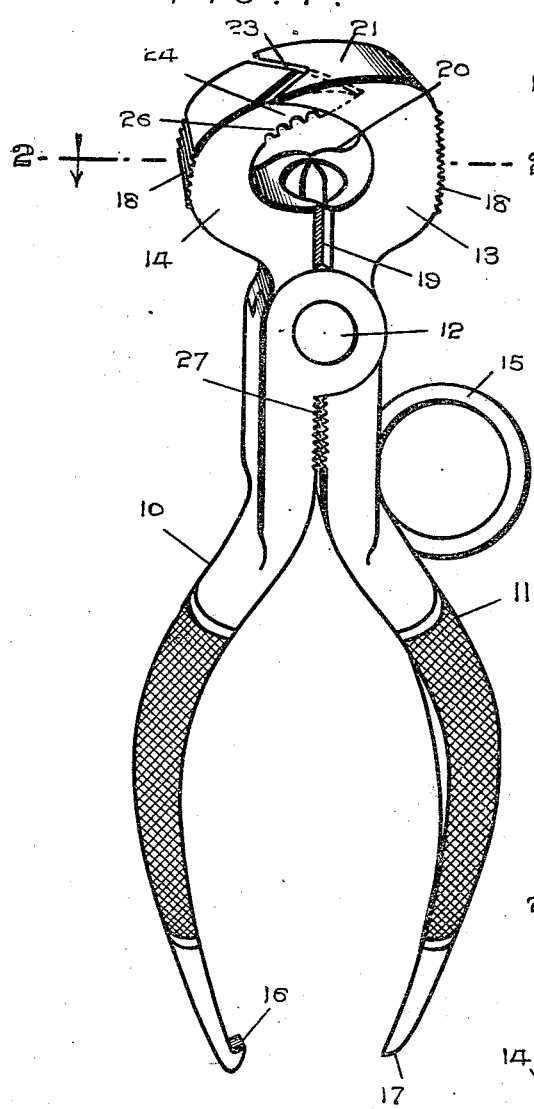
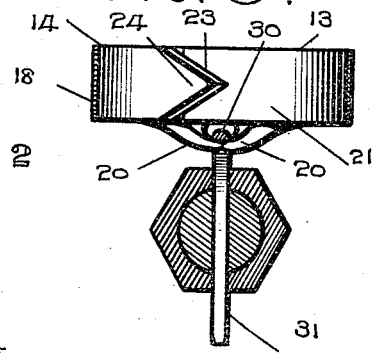
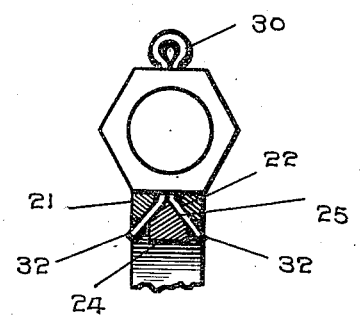
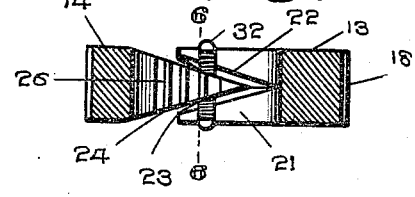
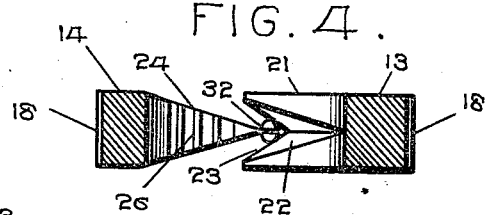
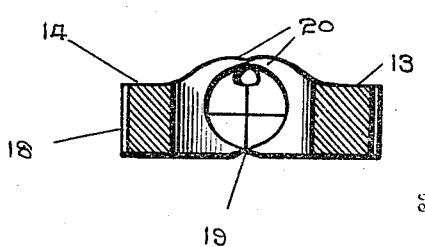
Inventor:
R. A. CROSBY,
By W. J. FitzGerald & Co.
Attorney.

Patented May 13, 1924.

1,493,477

UNITED STATES PATENT OFFICE.

RAYMOND A. CROSBY, OF HOLYOKE, COLORADO.

COTTER-PIN TOOL.

Application filed June 28, 1922. Serial No. 571,346.

*To all whom it may concern:*

Be it known that I, RAYMOND A. CROSBY, a citizen of the United States, residing at Holyoke, in the county of Phillips and State of Colorado, have invented certain new and useful Improvements in Cotter-Pin Tools; and I do hereby declare the following to be a full, clear, and exact description of the invention, such as will enable others skilled in the art to which it appertains to make and use the same.

The present invention relates generally to tools of the plier type, and aims to provide a combination tool of novel and improved construction adapted especially for use in connection with different operations on cotter-pins, although the implement can be used for other purposes also to advantage.

Another object is the provision of a cotter-pin tool combining all of the implements necessary in operating on cotter-pins, and the component elements being arranged and constructed in a novel and improved manner to enhance the utility and efficiency of the tool.

The tool forming the subject-matter of the present invention combines in one implement a cotter-pin clincher, a cotter-pin gage, a cotter-pin hammer, a cotter-pin extractor, a cotter-pin and wire cutter, a cotter-pin and wire grip, a clinch releaser and drag hook, and a cotter-pin starter. The arrangement of such elements is such that they can all be conveniently used for the intended purposes, and to provide a tool of general utility for operating on cotter-pins and useful for other purposes also.

A further object is the provision in the tool of a novel and improved cotter-pin clincher.

A still further object is the provision in the tool of novel cotter-pin extracting means.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a perspective view of the improved tool;

Fig. 2 is a section on the line 2—2 of Fig. 1;

Fig. 3 is an end view showing the tool in use for extracting a cotter-pin;

Fig. 4 is a sectional view on the line of section of Fig. 2, looking in the opposite direction, and showing the parts in position for starting the clinching of a cotter-pin;

Fig. 5 is a view similar to Fig. 4 showing the parts when completing the clinching of the pin; and Fig. 6 is a section on the line 6—6 of Fig. 5 showing a cotter-pin clinched.

The tool is of the plier type, and comprises the levers or handles 10 and 11 crossing one another and pivoted together at the point of crossing, as at 12, and said levers have the respective jaws 13 and 14 beyond the pivot. Said jaws are of curved shape, with their concaved surfaces confronting one another. An outstanding holding ring and finger guard 15 is secured to the lever or handle 11 near the pivot, for holding the tool and also receiving and guarding a finger of the hand which grasps the handles. The terminal of the handle or lever 10 is formed with a clinch releaser and drag hook 16 which can be conveniently used in bending the terminals of a clinched cotter-pin back, and for other purposes. The terminal of the handle or lever 11 is formed with a pointed horn forming a cotter-pin starter 17. Said horn 17 can be inserted through the eye of a cotter-pin and the lever 11 used as means for prying the cotter-pin.

The opposite convex surfaces of the jaws 13 and 14 are provided with the teeth or roughened portions 18 providing hammer surfaces, whereby the jaws can be used as a hammer head for hammering or driving cotter-pins and other objects. Said jaws are formed at one side adjacent to the pivot with the cutter blades or edges 19 for cutting cotter-pins, wire, and other objects.

In order that the tool can be used in an effective manner for extracting cotter-pins, the jaws 13 and 14 are formed at that side opposite to the cutters 19 adjacent to the pivot 12 with the bills 20 offset from said side of the jaws and converging and projecting toward one another, whereby when the handles are swung toward one another by grasping them in the hand, said bills 20 are brought together to engage in the eye 30 of a cotter-pin 31, as seen in Fig. 3, whereby the tool can be used as a lever or pry for pulling the cotter-pin out of the object, and the tool can be swung on any suitable fulcrum, either a part of the object or a part of the tool, for extracting the cotter-pin with sufficient leverage or purchase to overcome any resistance offered by the pin.

The terminals of the jaws 13 and 14 are formed to provide a cotter-pin clincher. For this purpose, the terminal portion of the jaw 13 is tapered to decrease its thickness down to a sharp edge at the end of the jaw, but said terminal portion 21 is of substantially the same width as the jaw. The inner surface of the clincher portion 21 has a groove 22 of V-shaped cross-section, and said groove is tapered from the end of the portion 21 to a point at a distance from said end. The larger end of the groove 22 opens through the end of the portion 21 to form the notch 23 in said end, and the clincher portion 21 somewhat resembles the claw of a claw-hammer, although the portion 21 is used for a different purpose and forms a die member for defining the clinching of a cotter-pin. The terminal portion 24 of the jaw 14 is tapered to the end thereof, both in thickness and width, so that said portion 24 provides a wedge, which is curved to move behind the clincher portion 21. The outer side of the clincher portion 24 is formed with a V-shaped ridge 25 corresponding in shape with the groove 22 to match and fit in said groove, and the groove 22 provides the female portion of the clinching die portion 21, while the ridge 25 provides the male die portion of the clinching portion 24. The clincher portions 21 and 24 overlap when the jaws are closed.

In using the tool for clinching a cotter-pin, as illustrated in Figs. 4, 5, and 6, the backs or outer surfaces of the portions 21 and 24 are placed against the object through which the cotter-pin is inserted and the jaws are separated with the terminals 32 of the cotter-pin in the notch 23, as seen in Fig. 4. The notched portion or end of the jaw 13 contacts with or abuts the cotter-pin at one side of said pin, so that the portion 24 can be forced between the terminals of the pin from the opposite side. Then, by properly positioning the tool, and forcing the jaws together, the sharp end of the wedge-shaped clinching portion 24 can be started between the terminals 32, as seen in Fig. 4, to separate said terminals. By forcing the jaws together further, the portion 24 wedges between the cotter-pin terminals behind the notched portion or end of the jaw 13 and bends them apart until said terminals are clamped between the transversely inclined side surfaces or walls of the groove 22 and ridge 25, as seen in Figs. 5 and 6. The clincher portion 24 thus separates and bends the terminals 32 of the cotter-pin against the walls of the groove 22, and the bends of the pin are made close to the object. By separating the handles, the jaws are separated and the portions 21 and 24 are readily removed from the clinched pin. In this way, it is a convenient matter to clinch the pin, and the bending of the terminals 32 is limited and defined by the angles of the surfaces of the groove 22 and ridge 25.

The tool is provided with a gage for cotter-pins of different sizes. Thus, the inner surface of the portion 24 of the jaw 14 is provided with transverse grooves 26 of different widths whereby cotter-pins of different sizes can be gaged.

The levers 10 and 11 are also formed between them adjacent to the pivot 12 with the toothed gripping portions 27 for gripping cotter-pins, wire, and other objects.

The present device thus provides an all-around tool for use in operating on cotter-pins, without the aid of other implements than those embodied in the tool.

Having thus described the invention, what is claimed as new is:—

1. A cotter-pin tool having a pair of jaws, one jaw having its end formed to abut a cotter-pin at one side of the pin, and the other jaw being wedge-shaped to pass between the terminals of the pin and behind the first-named jaw in overlapping relation therewith for bending said terminals apart behind the first-named jaw.

2. A cotter-pin tool having a pair of jaws, one jaw having a notch at the end thereof for receiving a cotter-pin and abutting said pin at one side thereof, the other jaw being wedge-shaped to pass between the terminals of said pin behind the first-named jaw in overlapping relation therewith for bending said terminals apart.

3. A cotter-pin tool having a pair of jaws, one jaw having a groove and a notch, and the other jaw being formed to pass between terminals of a cotter-pin engaged in said notch to bend said terminals apart in said groove.

4. A cotter-pin tool having a pair of jaws, one jaw having a groove and a notch at the end of the groove, and the other jaw being wedge-shaped to pass between the terminals of a cotter-pin engaged in said notch and to enter said groove for bending said terminals apart.

5. A cotter-pin tool having a pair of jaws, one jaw having a groove of V-shape cross-section and a notch at the end of the groove, the other jaw being wedge-shaped to pass between terminals of a cotter-pin engaged in said notch and having a ridge of V-shaped cross-section to enter said groove and spread said terminals apart.

6. A cotter-pin tool comprising pliers having jaws with terminals projecting in opposite directions toward one another to move together in overlapping arrangement, the outer terminal being formed to abut a cotter-pin at one side thereof, and the inner terminal being wedge-shaped to pass between the terminals of the cotter-pin from the opposite side for bending said terminals apart behind the outer terminal.

7. A cotter-pin tool comprising pliers having jaws with terminals projecting in opposite direction toward one another and arranged to move together in overlapping arrangement, the outer terminal having a notch for receiving a cotter-pin and to abut the cotter-pin at one side thereof, the inner terminal being pointed and having a V-shaped portion to pass between the terminals of the cotter-pin behind the outer terminal for bending the terminals of the cotter-pin apart.

8. A cotter-pin tool comprising pliers having a pair of jaws, one jaw being tapered and having a groove at its inner side of V-shaped section and a notch formed in the end of said jaw by said groove, the other jaw being adapted to move behind the aforesaid jaw and being of wedge-shape to pass between the terminals of a cotter-pin engaged in said notch, the last-named jaw having a ridge of V-shaped section to enter said groove and bend the terminals of the cotter-pin apart.

In testimony whereof I have signed my name to this specification in the presence of two subscribing witnesses.

RAYMOND A. CROSBY.

Witnesses:
C. E. PAUL,
GLADYS GUILD.